Figure 1:
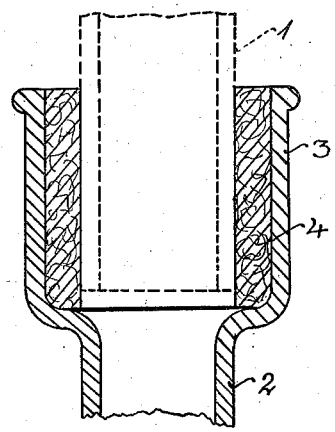

June 21, 1938.   K. K. LARSEN   2,121,322
SOCKET JOINT
Filed Feb. 11, 1937

Inventor:
Kai Knud Larsen
By Peter M. Bossen Atty.

Patented June 21, 1938

2,121,322

UNITED STATES PATENT OFFICE 2,121,322

SOCKET JOINT

Kai Knud Larsen, Copenhagen, Denmark

Application February 11, 1937, Serial No. 125,187
In Denmark February 12, 1936

2 Claims. (Cl. 285—47)

The present invention relates to improvements in socket joints with the object of providing means through which such socket connections may be obtained in a simple and easy manner.

The main features of the invention are that the socket is prior to the assembling with the pipe furnished with a packing of a material which under normal temperature conditions maintains a solid form, but when subjected to heat becomes liquid or plastic. Substances suitable for this purpose are for instance asphalt or similar bituminous adhesive materials.

In the hitherto known socket joints the socket and the tube to be connected therewith are first adjusted in relation to each other, whereupon there is introduced or cast between them the material, for instance lead or asphalt, by means of which the connection is to be made. This method has, however, in many instances essential disadvantages, as it is often difficult to get in a position for effectuating the insertion or casting of the material employed, as likewise this is rendered very difficult with socket joints in which the axis of the socket is not vertical or approximately vertical, but tends towards the horizontal.

According to the present invention there is employed a socket member or a pipe provided with a socket, in which socket there is prior to the assembling inserted an annular packing of bitumen or the like, which is either cast or pressed into the socket, so that the socket member, or the pipe provided with a socket, is supplied with such an annular packing inserted within the socket, or the annular packing is supplied as a separate unit that is inserted loosely within the socket immediately before the parts to be assembled are adjusted in their relative positions. When this has taken place the connection is brought about by heating the socket with the annular packing, for instance by means of a blower lamp, and the packing is thereby first rendered semi-liquid or plastic and thereupon to some extent so liquid that it adheres to the parts that are to be assembled.

The annular packing of asphalt, bitumen or the like may when supplied as a separate unit for insertion within the socket be formed in a single piece, or when intended for bipartite sockets, which are to be clamped around a pipe, it may be supplied in the form of two semi-annular pieces. Similarly to undivided sockets each half of a bipartite socket may be provided with a semi-annular packing that is either cast or pressed into the separate parts of the socket, which are thus ready for application.

The material constituting the annular packing may as above mentioned consist of asphalt or any similar bituminous substance, and this may be mixed with finely ground organic or inorganic substances, but other substances may be employed, the main object being that the material employed is solid when subjected to normal temperature, and that it becomes liquid or plastic when subjected to a suitable degree of heating.

The invention may be employed in connection with a great number of different joints of pipes, such as for instance the joining of glazed earthenware pipes, piping for drains, cast iron piping, piping for all plumbing, etc. Furthermore the invention is applicable to the joining of pipes carried through partitions such as floors and walls, and to cold and hot water pipes and pipes in central heating plants. With this in view there is employed a socket fitted with an annular packing of bitumen or the like that fits a bush in the partition, or another member tightly connected with the bush, and which is arranged to fit tightly on the pipe inserted through the bush. Such a bush may be bipartite, and each half provided with a semi-annular packing of asphalt or bitumen, while the collar of the bush is arranged to engage a packing against the pipe, when the parts of the bipartite socket are assembled.

Figure 3:
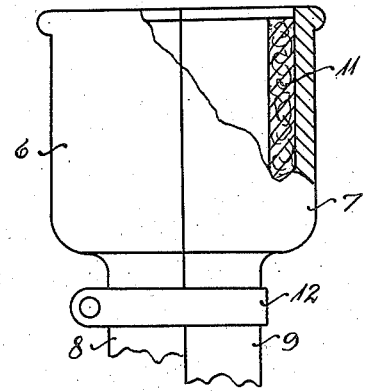
Figure 2:
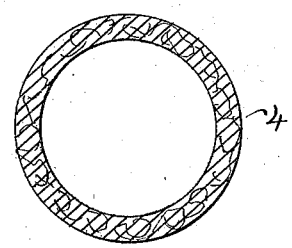
Figure 4:
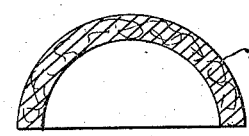
Figure 5:
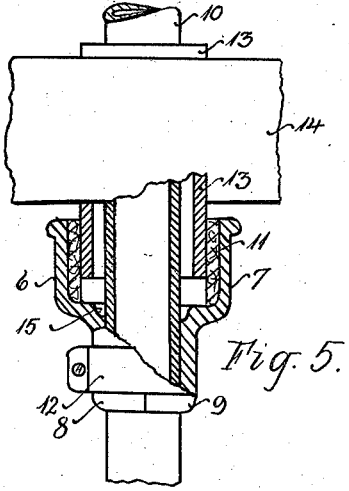
Figure 6:
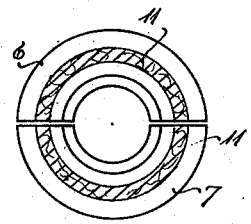
Figure 7:
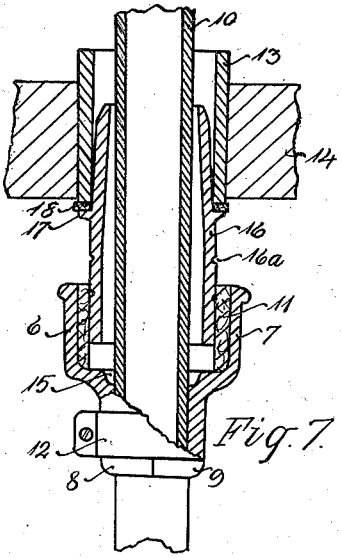

The invention is illustrated in the accompanying drawing, where Fig. 1 is a sectional view of a socket joint according to the invention, Fig. 2 an end elevation of an annular packing member, Fig. 3 a side elevation partly in section of a bipartite socket including a bipartite packing, Fig. 4 an end elevation of a semi-annular packing member, Fig. 5 a side elevation partly in section of a socket joint for a pipe transversing a partition, Fig. 6 a top view of the socket member shown in Fig. 5 with pipe and bush removed, and Fig. 7 a modification of the socket joint illustrated in Fig. 5.

Referring to Fig. 1 of the drawing 1 indicates a pipe to be connected with another pipe 2 that is provided with a socket 3. According to the invention there is disposed within this socket 3 an annular packing member 4, which may for instance consist of asphalt, and which annular packing member prior to the joining of the pipes 1 and 2 is either cast into or in any other appropriate manner fixed within the socket. The packing member 4 may otherwise be supplied as a separate unit (Fig. 2) that is inserted within the socket 3 immediately before the joining of the pipes is to take place. The annular packing member 4 has an interior diameter corresponding to or slightly larger than the exterior diameter of the pipe 1. When this pipe 1 is in position within the socket 3, the latter is heated for instance by means of a blower lamp to the effect that the packing substance is rendered so plastic that it adheres to the pipe 1, and upon subsequently cooling there is produced a firm and tight joint between the pipes 1 and 2.

The pipes of central heating plants or other pipes subjected to considerable variations in temperature, and which are carried through partitions are joined by means of a bush with an interior diameter suitably larger than the exterior diameter of the pipe to allow movement of the latter in consequence of expansion and contraction due to variations in the temperature to which it is subjected.

The places where such pipes are carried through partitions give occasion to a number of inconveniences, such as allowing bugs, cockroaches and other injurious insects to pass from one room or story to another along the open spaces around the pipes, and likewise odours and noise are enabled to penetrate to adjoining compartments.

To eliminate these inconveniences there have been proposed a number of various means for closing the space between the partitions and the pipes carried therethrough. These means have, however, hitherto proved unsatisfactory, as they are either too complicated, or they do not provide full guarantee of an effective and durable packing.

A socket joint according to the present invention modified to meet the requirements of such pipes carried through partitions is shown in Figs. 3, 4, 5 and 6. The socket member comprises here two halves 6 and 7, and each half is provided with a semi-annular collar 8 and 9 respectively, which collar when assembled has approximately an inside diameter corresponding with the outside diameter of a pipe 10 in connection with which the joint is to be made. Within each socket part there is inserted a semi-annular packing member 11 in the same manner as described in relation to the annular packing member 4. When applied to the pipe 10 the bipartite socket parts are clamped together by means of a clamp 12 embracing the parts 8 and 9 of the collar. The pipe 10 is carried through a bush 13 transversing a partition 14, for instance a floor, and projecting somewhat below this partition. Between the interior of the bush 13 and the exterior of the pipe 10 there is sufficient space to allow for the expansion and contraction of the pipe 10 in consequence of variations in temperature to which the pipe is subjected in use. A bipartite socket member as that illustrated in Fig. 3 is applied to the pipe 10 below the partition and clamped in position thereon in such manner that the socket with the previously inserted packing embraces the end of the bush 13 extending below the partition. In this position the socket member is heated for instance by means of a blower lamp, and the packing, which as above mentioned preferably comprises a bituminous material, becomes semi-liquid and provides a tight packing between the socket and the bush, and likewise closes the end of the pipe 10 within the socket. To prevent any of the packing material from oozing out between the pipe 10 and the collar parts 8 and 9, the latter have along their inner surfaces grooves 15 for a packing.

By these means there is provided a socket joint that is completely tight, but which allows the pipe 10 sufficient free movement within the bush to meet any requirements due to variations in temperature to which the pipe may be subjected.

In existing central heating plants it is not always possible to apply the socket member in the manner described above, owing to the lower end of the bush 13 not extending sufficiently below the partition 14. In such instances it is necessary to employ an intermediate tube 16 that is introduced between the bush 13 and the socket members 6 and 7. This intermediate tube 16 is bipartite, and the parts assembled around the pipe 10 by means of wires resting in grooves 16a, and when assembled its one end tapers somewhat to allow it to be inserted within the lower end of the bush 13, and it is provided with a radially extending flange 17, between which flange and the lower edge of the bush 13 there is inserted a packing member 18. The opposite end of the tube 16 is cylindrical and of a somewhat larger diameter than the pipe 10 and is embraced by the socket members 6 and 7, when the socket collar 8, 9 is clamped to the pipe 10 in the same manner as described in connection with the construction illustrated in Fig. 5, the cylindrical end of the intermediate tube 16 here serving the same purpose as the end of the bush 13 as shown in Fig. 5.

The last described modification of the invention is preferably intended for employment in already existing central heating plants, whereas in connection with plants to be made the more simple construction as illustrated in Fig. 5 is to be preferred.

I declare that what I claim is:

1. A socket for assembling a pipe with a bush transversing a partition, comprising a bipartite socket member, a bipartite packing member inserted within the socket member prior to the assembling of the joint, a semi-annular collar extending from each part of the socket member, a groove within the inner wall of each semi-annular collar, a packing within each said groove, and means for clamping the collar members with their socket member parts together on a pipe to form a socket joint with the said bush.

2. A socket joint for assembling a pipe carried through a bush in a partition, comprising an intermediate tapered tube inserted with its narrow end within one end of the bush, a flange extending radially from the tube, a packing inserted between the flange and the end of the bush, a bipartite socket member, packing members inserted within each socket member part prior to the assembling of the joint, a semi-annular collar extending from each socket member, means for clamping the semi-annular collars together on the pipe in a position in which the bipartite socket and packing members engage the free end of the intermediate tube, and a packing introduced between the collar parts and the pipe.

KAI KNUD LARSEN.